(12) United States Patent
Pausch et al.

(10) Patent No.: US 9,080,602 B2
(45) Date of Patent: Jul. 14, 2015

(54) BEARING DEVICE HAVING A SAFETY BEARING

(75) Inventors: Michael Pausch, Dittelbrunn (DE); Wolfgang May, Kitzingen (DE); Horst Masuch, Schweinfurt (DE); Jan Georgi, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/988,365

(22) PCT Filed: Nov. 10, 2011

(86) PCT No.: PCT/EP2011/069817
§ 371 (c)(1),
(2), (4) Date: Sep. 20, 2013

(87) PCT Pub. No.: WO2012/065899
PCT Pub. Date: May 24, 2012

(65) Prior Publication Data
US 2014/0003755 A1    Jan. 2, 2014

(30) Foreign Application Priority Data
Nov. 20, 2010    (DE) .......................... 10 2010 052 101

(51) Int. Cl.
| F16C 19/52 | (2006.01) |
| F16C 33/58 | (2006.01) |
| F16C 19/54 | (2006.01) |
| F16C 19/18 | (2006.01) |
| F16C 23/08 | (2006.01) |
| F16C 32/04 | (2006.01) |
| F16C 39/02 | (2006.01) |

(52) U.S. Cl.
CPC ............... *F16C 19/52* (2013.01); *F16C 19/183* (2013.01); *F16C 19/542* (2013.01); *F16C 23/08* (2013.01); *F16C 32/0442* (2013.01); *F16C 33/586* (2013.01); *F16C 39/02* (2013.01); *F16C 2240/40* (2013.01)

(58) Field of Classification Search
CPC ............................. F16C 33/586; F16C 19/542
USPC ............. 384/95–96, 504–505, 512, 538, 571, 384/615, 625–625, 627, 613
See application file for complete search history.

(56) References Cited

U.S. PATENT DOCUMENTS

| 1,379,945 | A | * | 5/1921 | Teetsow | 384/504 |
| 1,467,378 | A | * | 9/1923 | Hanson | 384/504 |
| 3,816,013 | A | * | 6/1974 | Schuhmann | 384/538 |
| 4,343,565 | A | * | 8/1982 | Hallerback | 403/370 |
| 4,596,477 | A | * | 6/1986 | Lundgren | 384/538 |
| 4,628,522 | A | | 12/1986 | Ebersberger | |
| 6,661,143 | B1 | | 12/2003 | Ohura | |
| 6,715,913 | B2 | * | 4/2004 | Engel | 366/331 |

(Continued)

FOREIGN PATENT DOCUMENTS

| DE | 19729450 | 2/1999 |
| DE | 60209752 | 11/2006 |

(Continued)

*Primary Examiner* — Marcus Charles
(74) *Attorney, Agent, or Firm* — Volpe and Koenig, P.C.

(57) ABSTRACT

A bearing device having a bearing which rotatably supports a shaft, and a safety bearing (1) which receives the shaft in the event of a failure of the bearing. The aim of extending the service life of the safety bearing in the bearing device described above is achieved according to the invention in that a bearing race (2) of the safety bearing (1) facing the shaft comprises a lateral surface (3) having a convex contour (4) facing toward the shaft.

10 Claims, 3 Drawing Sheets

(56) References Cited

U.S. PATENT DOCUMENTS

| | | | |
|---|---|---|---|
| 8,500,336 B2 * | 8/2013 | Kouscheschi et al. | 384/418 |
| 2002/0181818 A1 | 12/2002 | Bridges | |
| 2004/0189124 A1 * | 9/2004 | Baudelocque et al. | 384/624 |

FOREIGN PATENT DOCUMENTS

| | | | | | |
|---|---|---|---|---|---|
| DE | 102006019873 B3 | * | 10/2007 | | F16C 27/04 |
| GB | 578765 A | * | 7/1946 | | F16C 21/00 |
| JP | H061845 | | 1/1994 | | |
| JP | 10-159844 A | * | 6/1998 | | F16C 23/08 |
| JP | 2002130279 | | 5/2002 | | |
| JP | 2008203663 A | * | 9/2008 | | |
| JP | 2008203668 A | * | 9/2008 | | |
| WO | WO 2008099819 A1 | * | 8/2008 | | G03G 15/20 |
| WO | WO 2010006859 A1 | * | 1/2010 | | |
| WO | WO 2010043435 A1 | * | 4/2010 | | F16C 17/02 |

* cited by examiner

BEARING DEVICE HAVING A SAFETY BEARING

FIELD OF THE INVENTION

The invention relates to a bearing device.

BACKGROUND

From practical experience, bearing devices are known in which a bearing supports a shaft so that it can rotate, wherein the bearing device has a safety bearing that holds the shaft if the bearing fails, so that the shaft can run down in the safety bearing. The bearing ring of the safety bearing facing the shaft has, during normal operation of the bearing device, a distance to the shaft and is mechanically unloaded. If the safety bearing is constructed as an anti-friction bearing or if the safety bearing comprises at least one anti-friction bearing, the row of these anti-friction bearings is not or only slightly mechanically pre-tensioned by an additional spring means. For example, bearing devices are known with a magnetic bearing and a safety bearing that holds the shaft supported in the magnetic bearing if there is a loss of power.

If the shaft enters into the safety bearing, high forces and accelerations occur. In particular, if the safety bearing is made from anti-friction bearings and comprises at least one row of anti-friction bodies, there is the risk that the safety bearing will fail on the short term, because the anti-friction bodies are subject to high initial acceleration and slippage occurs due to the lack or only slight mechanical pre-tensioning of the anti-friction bodies. This slippage is associated with damage both to the anti-friction bodies and also of the bearing rings of the safety bearing, so that the safety bearing must be replaced often after only one use.

In practice, the case often occurs that the shaft acts on the bearing ring at an angle with respect to the rotational axis of this bearing ring of the safety bearing facing the shaft. Likewise the case occurs that the shaft is not only tilted with respect to this rotational axis, but also enters the safety bearing with a bent shape. A reason for this can be the time offset release of the shaft in the bearing or the failure of only one sub-bearing of several sub-bearings of the bearing. Due to the tilting or bending of the shaft, a section of the bearing ring of the safety bearing holding the shaft is subject to a high application of a force, while a different section of this bearing ring is subject to only a small application of force. Especially in a safety bearing formed as a multi-row anti-friction bearing, one row of anti-friction bodies is subject to a strong loading that leads to slippage, while the other row of anti-friction bodies is subject to no loading. If the safety bearing comprises two adjacent anti-friction bearings that contact each other, one of the two anti-friction bearings is loaded strongly and the other only slightly. In both cases, there is strong wear in the safety bearing that might need to be replaced after only one use.

DE 602 09 752 T2 describes a bearing device with a magnetic bearing and also a safety bearing, wherein the safety bearing comprises two axially adjacent, mutually contacting, mechanically pre-tensioned angular contact ball bearings. The two-piece lateral surface of the two-piece bearing ring of the safety bearing facing the shaft has, close to the end faces, a cylindrical form up to an edge rounding that is typical in anti-friction bearings and has a straight contour pointing parallel to the rotational axis of the two angular contact ball bearings. If the shaft enters into the safety bearing tilted or bent with respect to the rotational axis, the two angular contact ball bearings are loaded unequally, wherein especially strong slippage occurs in one of the two angular contact ball bearings. The safety bearing therefore has only a shortened service life.

DE 197 29 450 C2 describes a bearing device for supporting a rotor so that it can rotate in a bearing, wherein two anti-friction bearings formed as a single-row ball bearing are provided as a safety bearing. Each bearing ring of the safety bearing facing the rotor shaft has a cylindrical lateral surface up to the typical edge rounding at the transition to the end face with an essentially straight contour running parallel to the rotational axis of the bearing ring. If the shaft enters tilted or bent into one of the two ball bearings, the ball bearing is loaded unequally and its service life is significantly shortened.

SUMMARY

The objective of the invention is to prolong the service life of the safety bearing in the bearing device described in the introduction.

According to the claim for the safety bearing of the bearing device mentioned in the introduction, this objective is met according to the invention in that a bearing ring of the safety bearing facing the shaft has a lateral surface with a convex contour facing the shaft.

The convex contour is here provided in addition to an optionally present edge rounding of the bearing ring, wherein the edge rounding has only a slight extent in the axial direction (less than approx. 10%), but the convex contour extends in addition to the edge rounding by more than approx. 20% of the axial extent of the bearing ring. The convexity of the contour is here provided with respect to an imaginary cylindrical reference surface, wherein the cylindrical reference surface is assumed to be rotationally symmetric about the rotational axis of the bearing ring.

The convex contour offers a defined contact point of the shaft in the bearing ring of the safety bearing facing the shaft, wherein this contact point is adjustable to the respective bearing device. Due to the convexity of the contour, this contact point lies between the two end faces of the bearing ring, for example, centrally between the two end faces of the bearing ring. Here, the resulting force when the shaft enters the bearing is distributed as uniformly as possible over the entire bearing ring and can be better received overall by the safety bearing. As a result, the slippage is reduced and the expected service life of the safety bearing is increased.

If the bearing ring facing the shaft is formed as a bearing ring of a single-row anti-friction bearing, the resulting force when the shaft enters the bearing acts close to the track of the anti-friction bearing and thus, in particular, in the radial direction, so that axial force components are suppressed.

In a preferred construction, if the bearing ring facing the shaft is formed as a joint bearing ring of an anti-friction bearing with at least two rows, the force received by the bearing ring is distributed largely uniformly to the at least two rows of the safety bearing.

Advantageously it is provided that the contour of the bearing ring facing the shaft comprises a cylindrical section that extends over a maximum of approx. 80% of the axial extent of the bearing ring. The cylindrical section here makes possible the support of the shaft falling into the safety bearing on an enlarged surface area. The cylindrical section of the contour is here arranged shifted relative to the shaft with respect to the cylindrical reference surface defined above.

Advantageously it is provided that the contour of the bearing ring facing the shaft has at least one conical section. With the cylindrical reference surface, the conical section here encloses an angle of less than approx. 15°, in particular, approx. 5°.

One especially preferred contour is given when a middle third of the axial extent is formed by a cylindrical section and the two sections adjacent to the end faces are formed as conical sections that widen toward the end faces, wherein the two conical sections have an identical axial extent and each section has an angle of approx. 5° with respect to the cylindrical reference surface.

Advantageously it is provided that the contour of the bearing ring facing the shaft has a curved section. Due to the curve, the resulting force when the shaft enters the safety bearing is distributed better over the bearing ring.

With respect to the formation of the contour of the curved section of the convex contour facing the shaft, it is advantageously provided that the profile of the curve is given at least in some sections by a polynomial, in particular, by a quadratic function.

Alternatively—or additionally with respect to a second curved section—it is advantageously provided with reference to the formation of the contour that the profile of the curve is given by a conical section, in particular, by a circular arc segment or a segment of an ellipse. A hyperbolic or parabolic profile of the curve could also be provided depending on for which operating case the safety bearing is to be optimized.

Advantageously it is provided that the bearing ring facing the shaft is formed mirror symmetric to an axial parting plane.

As an alternative, it can be advantageously provided that the bearing ring facing the shaft is formed asymmetric to an axial parting plane. Due to the asymmetry, the situation can be counted on that the tilting or bending of the shaft often has a typical angle, so that the forces can be distributed more uniformly on the bearing ring.

The convex contour of the lateral surface of the bearing ring facing the shaft can be produced by material ablation starting from a cylindrical lateral surface with a straight cross-sectional contour.

Advantageously it is provided that the contour of the bearing ring facing the shaft is formed by an additional coating. The coating can be applied, for example, with a wet chemical process on an initially cylindrical lateral surface, wherein the thickness of the coating varies in the axial direction so that the convex contour is formed.

Advantageously it is provided that the contour of the bearing ring facing the shaft is formed by an additional component. The additional component can be, for example, a thin-walled sleeve whose outer cylindrical lateral surface is fixed, for example, by means of an interference fit on the inner, cylindrical lateral surface of the bearing ring, wherein the inner lateral surface of the sleeve has the desired convex contour. Such sleeves can be easily produced as sheet-metal parts.

Advantageously it is provided that the convex contour facing the shaft extends along the entire axial extent of the bearing ring. Close to the end faces, the convex contour can replace the typical edge rounding or transition into the edge rounding.

Additional advantages and features are given in the dependent claims and also in the following description of a preferred embodiment.

The invention will be described and explained in more detail below with reference to the accompanying drawings.

DETAILED DESCRIPTION OF THE PREFERRED EMBODIMENTS

Figure 1:
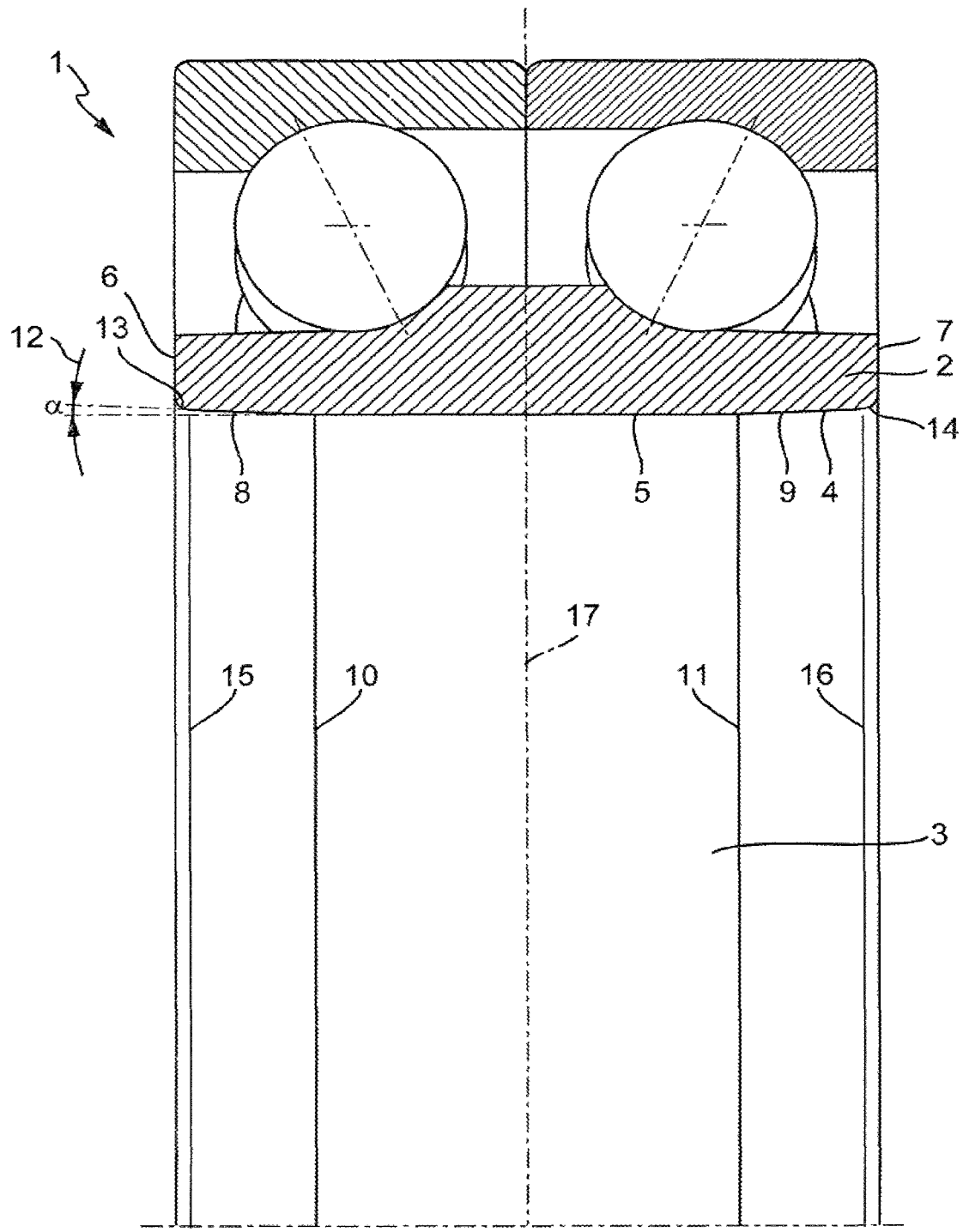
FIG. 1 shows, in a section view, a partially cutaway view of an embodiment of a bearing device according to the invention.
Figure 3:
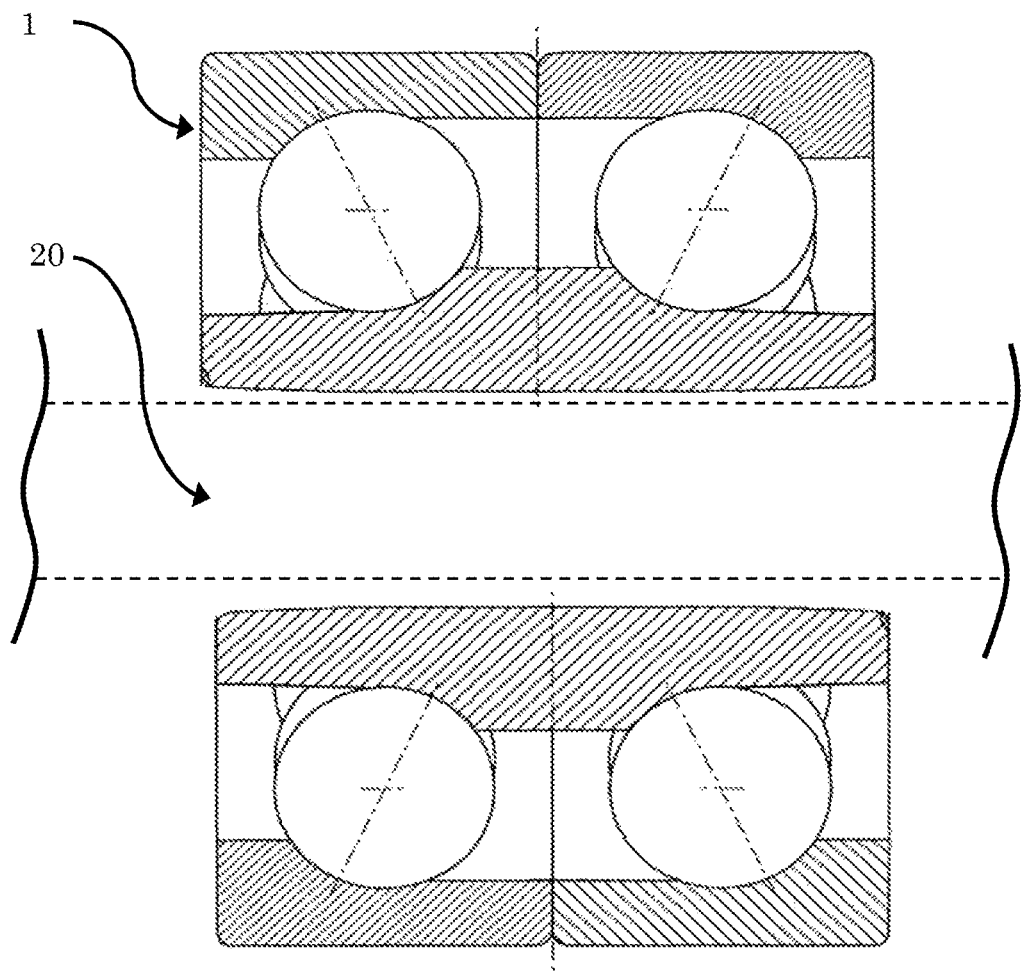
FIG. 3 shows a safety bearing arranged on a shaft.

FIG. 1 shows a bearing device comprising a shaft that is not shown in the figure and is supported so that it can rotate in a bearing, namely a magnetic bearing. The bearing device further comprises a safety bearing 1 that is formed as a two-row angular contact ball bearing, wherein the shown safety bearing 1, optionally together with at least one other safety bearing, holds the shaft if the magnetic bearing fails. FIG. 3 is similar to FIG. 1 and shows the safety bearing 1 arranged on the shaft 20 (shown in phantom lines).

The safety bearing 1 comprises a bearing ring 2 facing the shaft, namely the inner ring of the anti-friction bearing that has an inner lateral surface 3 that has a convex contour 4 that can be seen in cross section and that faces the shaft. Due to the convex contour 4, the cross-sectional line is no longer straight as is the case for a cylindrical inner lateral surface, but instead extends toward the shaft. When the bearing device is operating normally and when the shaft is supported in the magnetic bearing, the convex contour 4 has a distance to the lateral surface of the shaft. The shaft then comes in contact with the convex contour 4 when the magnetic bearing fails or is turned off.

The convex contour 4 comprises a cylindrical section 5 that is arranged centrally between the two end faces 6, 7 of the bearing ring 2. The cross-sectional line is straight in the region of the cylindrical section 5. The cylindrical section extends over approx. 60% of the entire axial extent of the bearing ring 2, that is, over approx. 60% of the distance of the two end faces 6, 7 measured in the direction of the rotational axis of the bearing ring 2. In one modification of the illustrated embodiment, the cylindrical section 4 can extend over up to approx. 80% of the entire axial extent of the bearing ring 2, but not over less than approx. 40% of the axial extent.

The convex contour 4 further comprises a first conical section 8 and also a second conical section 9, wherein each of the two conical sections 8, 9 is adjacent to the cylindrical section 5 along an edge 10, 11 on the inner lateral surface 3. In the area of the conical sections, the inner diameter of the inner lateral surface increases linearly toward the end faces 6, 7. Both conical sections 8, 9 extend together over approx. 35% of the axial extent of the bearing ring 2. With respect to a cylindrical reference surface that is given, for example, by the cylindrical section 5, each of the two conical sections 8, 9 encloses an angle 12 of approx. 5% as is shown in FIG. 1 for the first conical section 8.

Two edge rounding sections 13, 14 on the edges of the lateral surface 3 toward the two end faces 6, 7 are not part of the convex contour 4. With the adjacent conical sections 8, 9, the edge rounding sections 13, 14 form edges 15, 16. The edge rounding sections 13, 14 extend together over a total of approx. 5% of the total axial extent of the bearing ring 2, so that the convex contour 4 facing the shaft extends essentially along the entire axial extent of the bearing ring 2. In one modified embodiment, the edge rounding sections 13, 14 can be left out, so that the convex contour, for example, the conical sections 8, 9, are directly adjacent to the end faces 6, 7.

The bearing ring 2 facing the shaft—and thus the convex contour 4—is mirror symmetric to an axial parting plane 17.

Furthermore, the bearing ring 2 facing the shaft is formed as a common bearing ring of the two-row angular contact ball bearing.

FIG. 2 shows, in each of four sub-figures, a modification to the convex contour 4 shown in FIG. 1 for the inner lateral surface 3 of the bearing ring 2 facing the shaft of the safety bearing 1. It should be noted that the contour is shown enlarged in the direction toward the rotational axis of the bearing ring, in order to make it easier to see the profile of the contour.

Figure 2A:
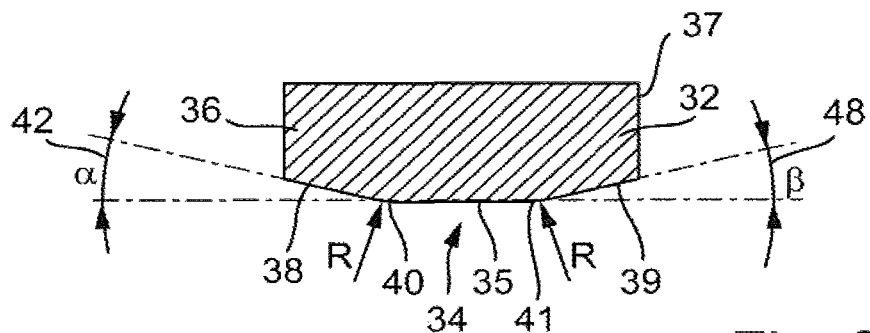
FIG. 2 shows, in the sub-figures a.) to d.), four modifications of the embodiment shown in FIG. 1.

FIG. 2a shows a convex contour 34 that comprises a cylindrical section 35 and two conical sections 38, 39, wherein the first conical section 38 encloses a first angle 42 and the second conical section 39 encloses a second angle 48 with a reference surface formed by the cylindrical section 35. The angles 42, 48 can have different magnitudes and can each equal less than approx. 15°. The conical sections 38, 39 transition to the cylindrical section 35 along rounded edges 40, 41. The cylindrical section 35 extends over approx. 45% of the entire axial extent of the bearing ring 32. The convex contour 34 borders directly on the end faces 36, 37 of the bearing ring 2, so that no edge rounding is provided.

Figure 2B:
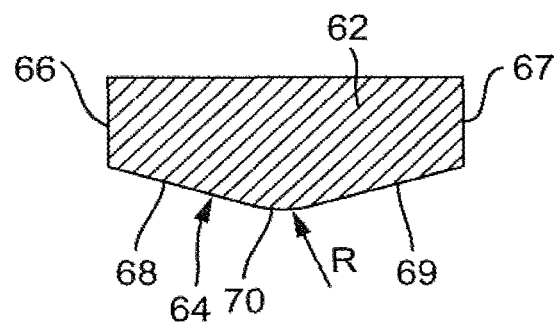

FIG. 2b shows a convex contour 64 that comprises a first conical section 68 and a second conical section 69 bordering this first section along a rounded edge 70, wherein the conical sections 68, 69 border directly on the end faces 66, 67 of the bearing ring 62.

Figure 2C:
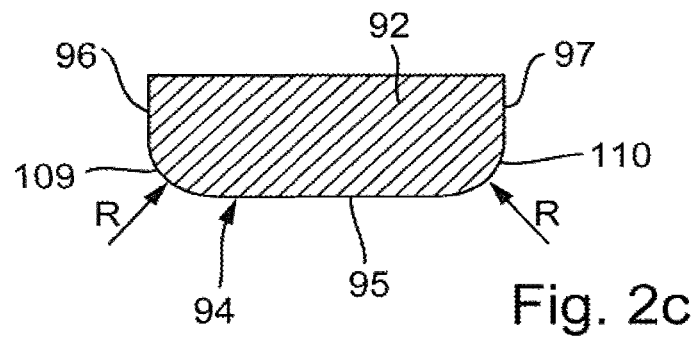

FIG. 2c shows a convex contour 94 that comprises a cylindrical section 95 that is arranged centrally between end faces 96, 97 and extends along approx. 80% of the total axial extent of the bearing ring 92. The convex contour 94 comprises two curved sections 109, 110 that each describe a quarter circle and are thus formed as circular arc segments. The curved sections 109, 110 transition without an edge into the end faces 96, 97 or into the cylindrical section 95.

Figure 2D:
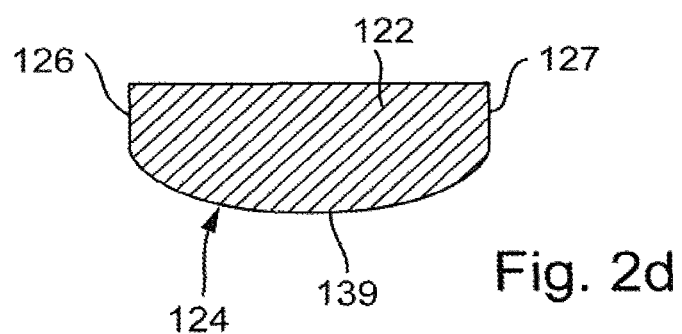

FIG. 2d shows a convex contour 124 whose single section is formed by a curved section 139 that extends between the two end faces 106 and 107. The profile of the curve of the section 139 is defined by a quadratic function along the entire axial extent of the bearing ring 122.

Each of the modifications shown in FIGS. 2a to 2d provides that the convex contour 34, 64, 94, 124 extends along the entire axial extent of the bearing ring 32, 62, 92, 122, so that each provides no edge rounding.

Each of the modifications shown in FIGS. 2a to 2d shows convex contours 34, 64, 94, and 124 that are formed symmetric to an imaginary axial parting plane of the respective bearing ring 32, 62, 92, 122. It is understood that contours that are asymmetric to the parting plane can also be provided; for example, starting from the modification shown in FIG. 2a, the angles 42 and 48 are different or, starting from the modification shown in FIG. 2c, the curvature radii of the curved sections 109 and 110 deviate from each other. Furthermore, starting from the embodiment shown in FIG. 2d, the profile of the curve of the curved section 139 cannot be formed by a quadratic polynomial, but also by a polynomial with odd exponents. Furthermore, for forming the asymmetry it can also be provided that one end face borders a cylindrical section and the other end face borders a conical or curved section. In particular, the middle section 35 (FIG. 2a) or 95 (FIG. 2c) or the edge 70 (FIG. 2b) can be shifted toward one of the two end faces.

The invention was described above with reference to an embodiment in which the shaft was formed as a solid shaft and the bearing ring facing the shaft was the inner ring of a bearing, namely a two-row angular contact ball bearing. It is understood that the bearing ring facing the shaft can also be an outer ring of a bearing if the supported shaft is a hollow shaft.

LIST OF REFERENCE NUMBERS

1 Safety bearing
2 Bearing ring
3 Lateral surface
4 Convex contour
5 Cylindrical section
6 First end surface
7 Second end surface
8 First conical section
9 Second conical section
10 First edge
11 Second edge
12 Angle
13 Edge rounding
14 Edge rounding
15 Edge
16 Edge
17 Axial parting plane
32 Bearing ring
34 Convex contour
35 Cylindrical section
38 Conical section
39 Conical section
40 Edge
41 Edge
42 First angle
48 Second angle
62 Bearing ring
68 First conical section
69 Second conical section
70 Rounded edge
92 Bearing ring
94 Convex contour
95 Cylindrical section
96 End surface
97 End surface
109 First curved section
110 Second curved section
122 Bearing ring
124 Convex contour
126 End surface
127 End surface
139 Curved section

The invention claimed is:

1. A bearing device comprising a safety bearing configured to hold a shaft if a bearing fails, the safety bearing includes a bearing ring facing the shaft that has a lateral surface with a convex contour facing the shaft, wherein the convex contour of the bearing ring facing the shaft comprises a cylindrical section that extends over at least 40% of an axial extent of the bearing ring and less than or equal to 80% of the axial extent of the bearing ring.

2. The bearing device according to claim 1, wherein the contour of the bearing ring facing the shaft has at least one conical section.

3. The bearing device according to claim 1, wherein the contour of the bearing ring facing the shaft has a curved section.

4. The bearing device according to claim 3, wherein a profile of the curved section is given at least in a section by a polynomial.

5. The bearing device according to claim 3, wherein a profile of the curved section is given by a conical section, by a circular arc segment, or a segment of an ellipse.

6. The bearing device according to claim 1, wherein the bearing ring facing the shaft is formed mirror symmetric to an axial parting plane.

7. The bearing device according to claim 1, wherein the bearing ring facing the shaft is formed asymmetric to an axial parting plane.

8. The bearing device according to claim 1, wherein the bearing ring facing the shaft is formed as a joint bearing ring of an anti-friction bearing with at least two rows.

9. The bearing device according to claim 1, wherein the convex contour of the bearing ring facing the shaft is formed by an additional coating.

10. The bearing device according to claim 1, wherein the convex contour of the bearing ring facing the shaft is formed by an additional component.

* * * * *